United States Patent [19]

Nomura

[11] Patent Number: 4,616,964
[45] Date of Patent: Oct. 14, 1986

[54] CARBIDE DRILL

[76] Inventor: Takuji Nomura, 12-64, Takakuracho, Nishinomiya, Hyogo, Japan

[21] Appl. No.: 503,481

[22] Filed: Jun. 13, 1983

[51] Int. Cl.⁴ .............................................. B23B 51/02
[52] U.S. Cl. ................................... 408/144; 408/145; 408/205; 408/230
[58] Field of Search ............... 408/205, 204, 206, 207, 408/211, 217, 218, 221, 222, 223, 224, 227, 228, 229, 230, 144, 145

[56] References Cited

U.S. PATENT DOCUMENTS 4,373,839  2/1983  Negishi et al. ................. 408/205 X Primary Examiner—Z. R. Bilinsky
Attorney, Agent, or Firm—Gabriel P. Katona

[57] ABSTRACT

At the top surface of a drill head, one or two tips are fixed radially with a little clearance from the axis of rotation, and thereby a nonmachining zone is formed around the axis of rotation. Each tip has its cutting edge formed projectingly from the radial line to a tangential direction and the distance from the axis of rotation to the cutting edge is made greater than the distance from the axis of rotation to an end face of the tip. The core which is generated and grows in the nonmachining zone in the course of machining is pressed by the end face of the tip and broken off, or is clamped between the end faces of the tips and wrenched off due to friction torque.

5 Claims, 13 Drawing Figures

4,616,964

CARBIDE DRILL

BACKGROUND OF THE INVENTION

The present invention relates especially to an improvement in a carbide drill for deep hole machining.

It is well known that in a carbide drill of this type, when two tips are attached to the drill head, the chisel edge (the very central point of the cutting edge) which does not carry out the machining function appears at the central point of rotation of the drill head and that accordingly the central portion of the workpiece is forcibly crushed around the central point of rotation of the drill head in the course of drilling work. Therefore, it has been believed that a two-tip carbide drill is suitable for drilling work on relatively soft nonferrous metals such as cast iron or aluminum, but not suitable for drilling work on hard metal such as steel materials because the tips are easily damaged due to great resistance generated when the workpiece is crushed and removed as well as great thrust resistance. As a result, a single-tip carbide drill in which the chisel edge does not appear has been used in processing of steel materials.

Even in a single-tip carbide drill, however, if a single tip is attached to the drill head in a radial direction with respect to the axis of rotation, the cutting edge must travel exactly on the axis of rotation as a matter of course in order to machine the workpiece up to its central portion. Therefore, in the manufacture of the drill, strict accuracy is required for attaching the tip. Even if the tip may be attached exactly, a load is imposed on the portion of the cutting edge which corresponds to the central point of the drill by the thrust resistance as the cutting speed at the central point of the drill is theoretically zero, which results in the fact that the tip is easily damaged and the machining ability cannot be increased. Moreover, a single-tip carbide drill is inferior to a two-tip carbide drill in its processing efficiency because of its lower amount of machining and feed amount.

Over against this, it has been proposed recently to provide a two-tip drill intentionally with a nonmachining zone between the two tips attached to the drill head in order to resolve said disadvantages of a two-tip drill. FIG. 13 shows an example of such a drill. This conventional structure is such that tips K1 and K2 are fixed to the drill head respectively in a radial direction with the axis of rotation O of the drill head H between and an opening of some 0.5 mm. in width, namely, a nonmachining zone Z is provided between both tips K1 and K2. It is believed that in performing machining through drilling, a core C is generated since, as shown in FIG. 12, the part of the workpiece which corresponds to the nonmachining zone Z is not machined as a matter of course but this core will not constitute a hindrance to the drilling work, because this core C is of an insignificantly small size which is generated in an opening of some 0.5 mm., so that said core will repeat its growth and disconnection from the workpiece itself in the course of machining to be taken away together with chips.

In this proposed conventional structure, machining does not include forcible crushing of the workpiece because the cutting edge (chisel edge) does not appear, and the thrust resistance and the damage of the tip can all the more be reduced. In some sorts of workpieces, however, the growing core is too strong to be removed because it is constructed such that the core C of the workpiece which grows in the nonmachining zone Z drops out by itself to be removed in the course of machining. In the case of a core of a larger diameter, it cannot be removed, either. Accordingly, it is not possible to make the width of the nonmachining zone Z large. Consequently, in the drill of this conventional type, dropping out of the core C is uncertain and there is no guarantee of the core C's dropping out surely in the course of machining.

SUMMARY OF THE INVENTION

The first object of the present invention is to make strict accuracy for mounting of the tip or tips unnecessary and reduce generation of damages to the tip or tips by removing intentionally the cutting edge of the area where the cutting speed is theoretically zero.

The second object of the present invention is to make the core which is generated in the course of machining drop out forcibly by breaking it off or wrenching it off, and thereby improve the machinability.

Other objects of the pesent invention will become apparent from the descriptions which follow.

DESCRIPTION OF PREFERRED EMBODIMENTS

Figure 1:
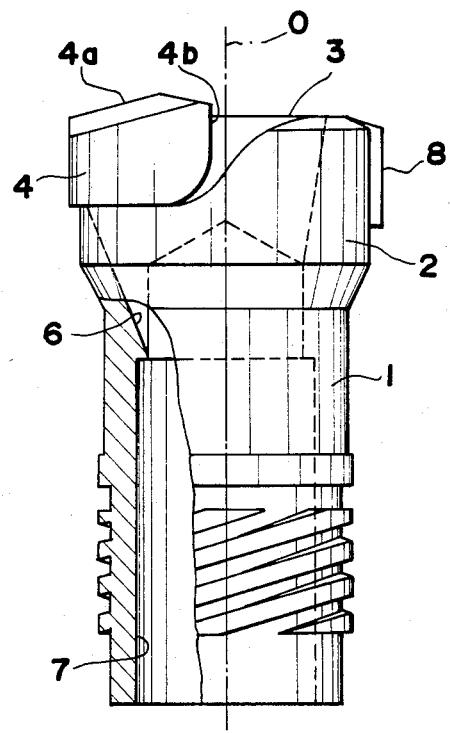
FIG. 1 is a front elevation showing an embodiment of the present invetion.
Figure 2:
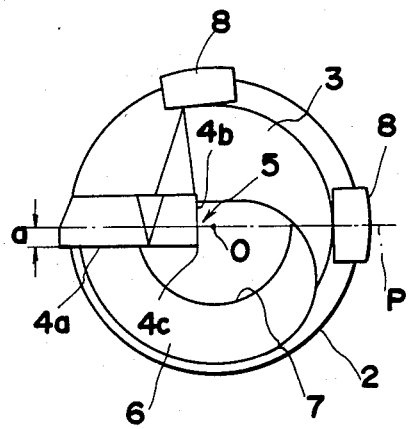
FIG. 2 is a plan view of same.
Figure 3:
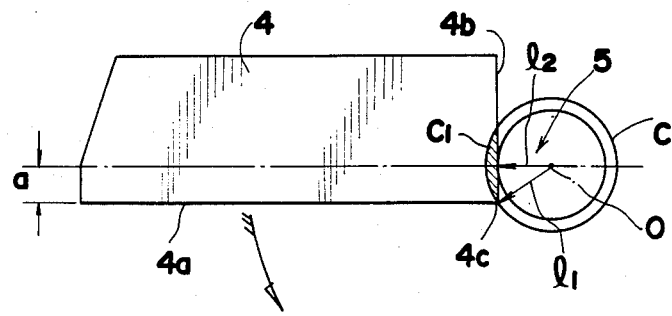
FIG. 3 is a plan view of a principal part of same and shows an operating condition.

In FIG. 1 and FIG. 2, numeral 1 denotes a drill body. A tip 4 is fixed at the top surface 3 of a drill head 2 of said body 1 in a radial direction P from the axis of rotation O. Said tip, however, is provided not to be adjacent to the axis O, but a nonmachining zone 5, that is, a small opening of some 1 mm. in width, for example, is provided between said axis O and the end face of the tip 4b. Moreover, a cutting edge 4a of said tip 4 is formed projectingly from said radial line P in a direction of a tangential line, with the amount of projection a of 1 mm. or so, for example, as shown in FIG. 3, thereby it is constructed such that a distance l1 from the axis of rotation O to the cutting edge 4a, more exactly, to the arris 4c on the axis side of the cutting edge is somewhat larger than a distance l2 from the axis of rotation O to the end face of the tip 4b on the axis side. In FIGS. 1 and 2, numerals 6, 7 denote holes for discharging chips both of which open in communication with the drill head 2 and the drill body 1 respectively. Numeral 8 denotes guide pads for the drill which are fixed on the outer peripheral surface of the drill head 2.

Figure 4:
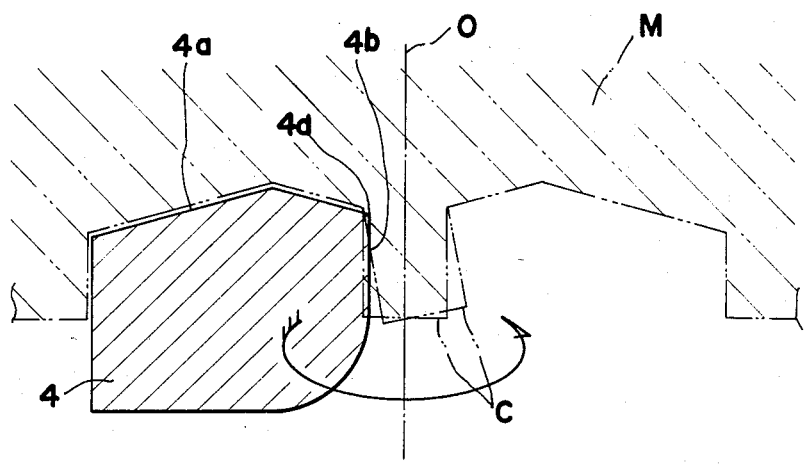
FIG. 4 is a vertical sectional front elevation of a principal part of same and shows an operating condition.

In the next place, phenomena which occur in the course of drilling machining will be explained. As the machining is being advanced by the tip 4 which rotates in the direction of the arrow, as shown in FIGS. 3 and 4, the core C of a workpiece M is generated and grows in the nonmachining zone 5. More exactly, the workpiece M is machined at the cutting edge 4a of the tip, and the core C grows in the area where the cutting edge 4a does not contact. That is, the distance l1 from the axis of rotation O to the cutting edge 4a is equal to the radius of the growing core C. On the contrary, as the distance l2 from the axis of rotation O to the end face of the tip 4b is shorter than the distance l1 from the axis of rotation to the cutting edge, as mentioned above, the core C comes to make an inroad into by the width of the area shown under C₁ in FIG. 3 due to elastic compression when the growing core C advances gradually along the end face of the tip 4b. The exertion of pressure by the tip 4 or the sliding frictional resistance burdens on the core C, and when the strength (shearing resistance) of the core C comes to be unable to endure said frictional resistance, the core C is broken off to drop out, as shown by a two-point chain line in FIG. 4.

Figure 5:
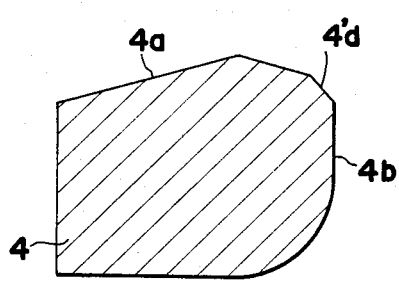
FIGS. 5 and 6 are vertical sectional front elevations of a principal part respectively showing other embodiments of the present invention.
Figure 6:
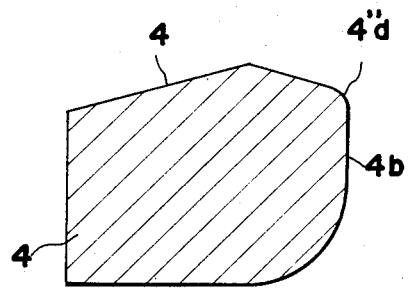

In this case, as shown in FIG. 4, the arris 4d of the end face of the tip 4b facing the nonmachining zone 5 performs pushing on the workpiece M in the axial direction and scarcely performs machining on it. But there is a little possibility of machining being performed by a bite function. Therefore, it is preferable to form said arris of the end face of the tip into a plain chamferred shape 4'd, as in the embodiment shown in FIG. 5, or into a circular form (convexly curved surface) 4"d as in the embodiment shown in FIG. 6 so that machining due to the bite function might not be performed.

Figure 7:
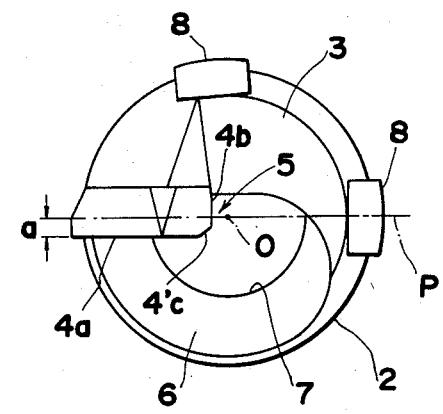
FIG. 7 is a plan view showing another embodiment of the present invention.

Furthermore, since the boundary between the portion where the workpiece M is cut at the cutting edge 4a and the portion where the workpiece M is not cut (core C), more concretely, the arris 4c on the axis side of the cutting edge, is liable to be subject to overloading in the course of machining, it is preferable to provide said cutting edge 4a which is formed projectingly from said radial line P to a tangential direction more projectingly in a tangential direction and simultaneously increase the strength of the cutting edge on the axis side by forming the arris on the axis side of the cutting edge at the cutting edge 4'c chamferred in the direction of the axis of rotation O as shown in FIG. 7.

Figure 8:
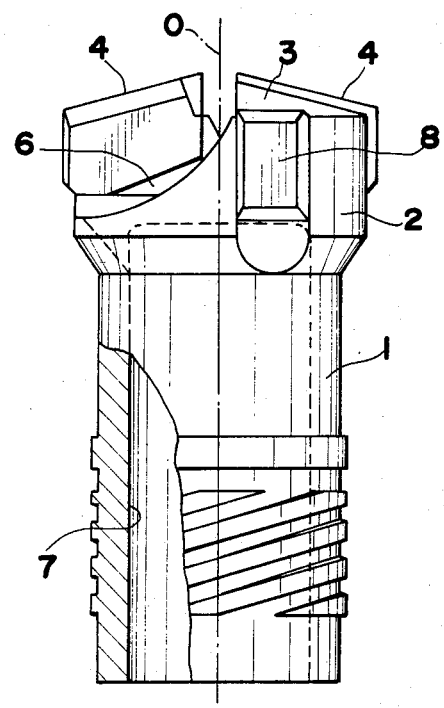
FIG. 8 is a front elevation showing a further embodiment of the present invention wherein two tips are provided.
Figure 9:
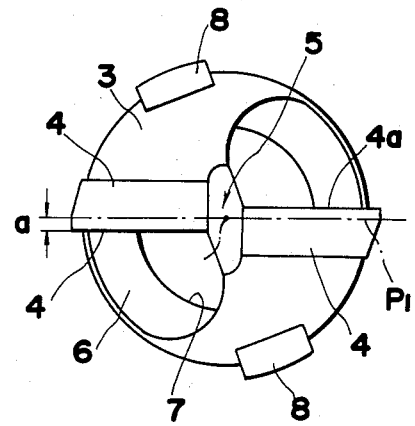
FIG. 9 is a plan view of same.
Figure 10:
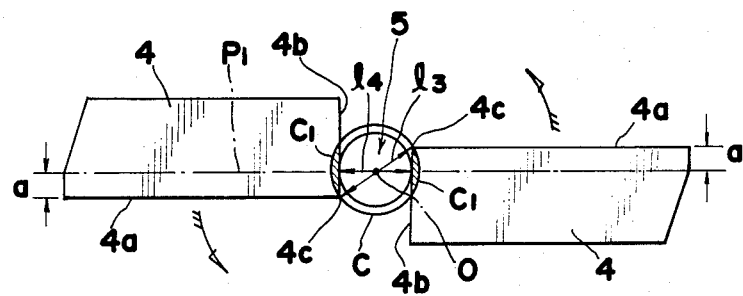
FIG. 10 is a plan view of a principal part of same and shows an operating condition.

In FIG. 8 which shows another embodiment of the present invention, on the top surface 3 of the drill head 2 in the body 1 two tips 4 are symmetrically fixed with respect to the axis of rotation O in the direction of a diametrical line P1. Both of the tips 4 do not contact each other on the axis of rotation O, as shown in FIG. 9 and especially in FIG. 10, both tips 4 are provided oppositely each other with a little clearance, namely, a nomachining zone 5 of some 1.5 mm. dia., for example, therebetween. Moreover, as shown in FIG. 10, each of the cutting edges 4a of both tips 4 is provided projectingly with the amount of projection a of some 0.5 mm., for example, mutually in tangential directions from said diametrical line P1, which enables the distance between both cutting edges 4a, more exactly, a distance l3 between the arrises on the axis side of the cutting edges 4c, to be somewhat greater than the distance between both tips 4, more exactly, a distance l4 between the end faces 4b opposing each other on the axis side.

Figure 11:
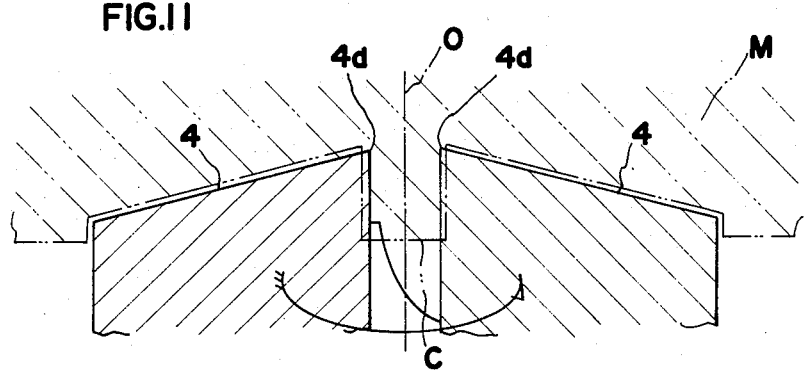
FIG. 11 is a vertical sectional front elevation of a principal part of same and shows an operating condition.
Figure 12:
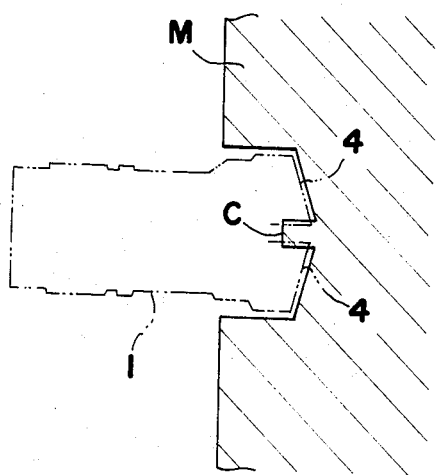
FIG. 12 is a schematic illustration of same showing an operating condition.
Figure 13:
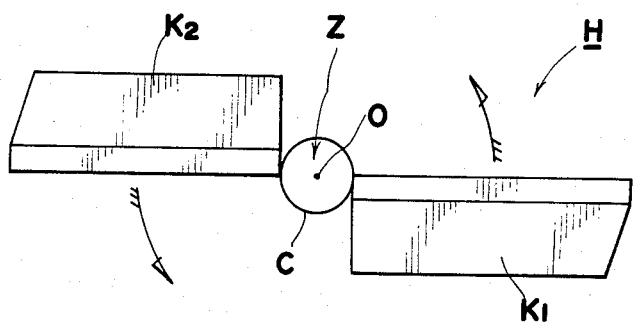
FIG. 13 is a plan view showing a conventional drill and explains an operating condition.

In the next place, a phenomenon occuring in the course of drilling machining will be described. As shown in FIGS. 10 and 11, a core C of the workpiece M is naturally generated and grows in the nonmachining zone 5 in the course of machining being carried out by a pair of tips 4 which rotate in the direction of the arrow. The cutting edges 4a of the tips machine the workpiece M to generate and grow the core C in the nonmachining zone 5 where both cutting edges 4a cannot cover. Therefore, the distance l3 between both cutting edges 4a corresponds to the diameter of the growing core C. On the other hand, the distance l4 between the end faces 4b of both tips 4 opposing each other is smaller than the distance l3 between both cutting edges, as mentioned above. Accordingly, the core C comes to make an inroad into by the width of the area shown under C₁ in FIG. 10 due to elastic compression when the growing core C gradually comes to enter between the end faces 4b of the tips. Said core C can be wrenched off for removal when both tips 4 impose their clamp action, namely, sliding frictional resistance, on the core C and the strength of the core C (shearing resistance) has come to be unbearable with respect to said frictional resistance. In the case both tips 4 are fixed not at exactly symmetrical positions but at positions somewhat deviated in a radial direction, the core C is first bent a little and made eccentric by the end face 4b of a tip which is closer to the axis O, and then said core is clamped between the end faces 4b of both tips and wrenched off.

In this embodiment, as mentioned in the description about another embodiment of the present invention, it is preferable to apply chamfering plainly to the arrises 4d of the end faces of the opposing tips 4b or form said arrises in a circular form (convexly curved surface). Moreover, it is also desirable to increase the strength of the cutting edges on the axis side by providing said cutting edges 4a which are provided projectingly from the diametrical line P1 in the tangential directions further projectingly in the tangential directions and chamfering the portions on the axis side of both cutting edges.

Therefore, according to the present invention, the area around the axis of rotation is made a nonmachining zone by providing a tip or two tips to the drill head in radial direction with a little clearance around said axis of rotation, and thereby the cutting edge has positively been removed from the portion where the cutting speed is theoretically zero, and the thrust resistance and generation of damages to the tip or tips due to said resistance may be all the more reduced to increase the cutting speed.

Furthermore, in the present invention, the distance between the axis of rotation and the cutting edge of the tip or each tip which is the radius of the growing core is made larger than the distance between the axis of rotation of the portion where the core enters and the end face of the tip or each tip by providing the cutting edge or edges of the tip or tips projecting from said radial line in the tangential direction or directions, so that a friction or a pressing force in the radial direction, namely, a torque for breaking off the core forcibly, applies between the gradually growing core and the end face or faces of the tip or both tips, and especially in the case two tips are provided at symmetrical positions, a frictional resistance, namely, a torque for wrenching off said core applies on the core between both tips. As a result, said core may be removed in the course of its growth by a forcible breaking off or wrenching off to make it possible to increase the machinability greatly in cooperation with said effect.

Therefore, the core can surely be removed and taken away completely together with the chips even if the core is strong enough. Also it is possible to remove the core forcibly without fail even if the radius of the newly generating core is great, namely, the width of the nonmachining zone is more or less great.

In a conventional type of drill as mentioned in the beginning, strictly precise treatment is required, because the cutting edge should pass the very axis of rotation exactly or the width of the nonmachining zone should be decided delicately. On the contrary, according to the present invention, the core is forcibly broken off or wrenched off. The necessary thing for this purpose is to fix one or two tips at a position or positions where a torque for breaking off or wrenching off the core utilizing its elastic compression is generated, and so the manufacturing of this kind of carbide drill is all the more easy.

What is claimed is:

1. A carbide drill comprising: means forming a nonmachining zone at one end thereof about the axis of rotation including at least one tip mounted radially along a radial line from the axis of rotation with a clearance and with the cutting edge of the tip offset forward of the radial line such that the distance from the axis of rotation to the cutting edge is greater than the distance from the axis of rotation to the end face of the tip and at least one arris on the end face of the tip facing the nonmachining zone to form a noncutting edge thereon.

2. A carbide drill as set forth in claim 1, wherein the nonmachining edge at the end face of the tip facing the nonmachining zone comprises the arris chamferred planarly.

3. A carbide drill as set forth in claim 1, wherein the nonmachining edge on the end face of the tip facing the nonmachining zone comprises the arris chamferred circularly to define a convex surface.

4. A carbide drill as set forth in claim 1, wherein said cutting edge projecting radially and extending tangentially further projects tangentially and further comprising an arris on the axis side of the cutting edge chamferred in the direction of the axis of rotation.

5. A carbide drill as set forth in claim 1, comprising two tips mounted in a point-symmetrical relationship with respect to said axis of rotation.

* * * * *